United States Patent [19]

Morrison et al.

[11] Patent Number: 5,061,947

[45] Date of Patent: Oct. 29, 1991

[54] MICROPROCESSOR CONTROLLED THERMAL PRINTER

[75] Inventors: Donald A. Morrison, Dayton; Richard D. Wirrig, Huber Heights, both of Ohio

[73] Assignee: Monarch Marking Systems, Inc., Dayton, Ohio

[21] Appl. No.: 209,946

[22] Filed: Jun. 22, 1988

[51] Int. Cl.[5] .......................... G01D 9/00; B41F 1/08; B32B 31/00; B65H 23/04

[52] U.S. Cl. .................................... 346/1.1; 346/136; 101/66; 101/288; 156/384; 156/577; 156/DIG. 47; 156/DIG. 49; 226/10; 226/24; 226/27; 226/45; 400/578; 235/375; 235/481; 235/494

[58] Field of Search .................. 346/76 PH, 1.1, 136; 354/21; 400/240.3, 240.4; 101/93.04, 93.05, 66, 288; 156/384, 577, DIG. 49, DIG. 47, 51, 361, 378; 226/28, 45, 10–20, 27, 24, 32, 33; 235/375, 481, 494

[56] References Cited

U.S. PATENT DOCUMENTS

| | | | |
|---|---|---|---|
| 3,774,016 | 11/1973 | Sterns et al. | 535/151.1 |
| 4,437,742 | 3/1984 | Taniguchi | 354/21 |
| 4,533,269 | 8/1985 | Pou et al. | 400/582 |
| 4,680,078 | 7/1987 | Vanderpool et al. | 156/352 |
| 4,717,059 | 1/1988 | Takahashi | 226/2 |

FOREIGN PATENT DOCUMENTS

| | | | |
|---|---|---|---|
| 0240950 | 10/1987 | European Pat. Off. . | |
| 61-130065 | 6/1986 | Japan | 400/120 |
| 59-253285 | 6/1986 | Japan | 400/120 |

*Primary Examiner*—Bruce A. Reynolds
*Assistant Examiner*—Gerald E. Preston
*Attorney, Agent, or Firm*—Mason, Kolehmainen, Rathburn & Wyss

[57] ABSTRACT

A microprocessor controller thermal printer particularly usable in a hand-held labeler for printing labels on a composite web detects indices on the web and automatically adjusts the distance that the web is advanced based on a measurement of the distance between indices made during a paper loading sequence. The printer includes automatic jam detection that measures the length of time that one of the indices is being detected and provides a jam indication if it is detected for more than a predetermined time period. A solenoid operated braking mechanism retains the web in position upon completion of a printing cycle to prevent the web from being moved relative to the print head while the label is being applied.

23 Claims, 5 Drawing Sheets

5061947
FIG. 1
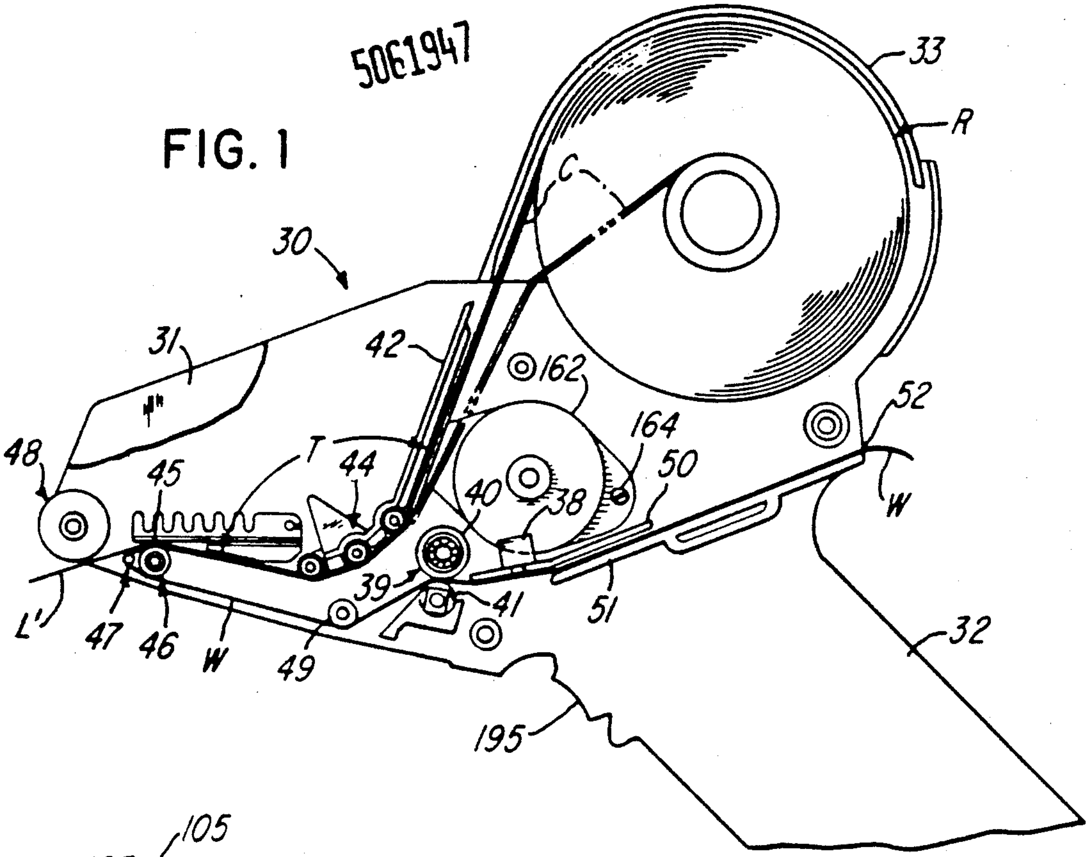
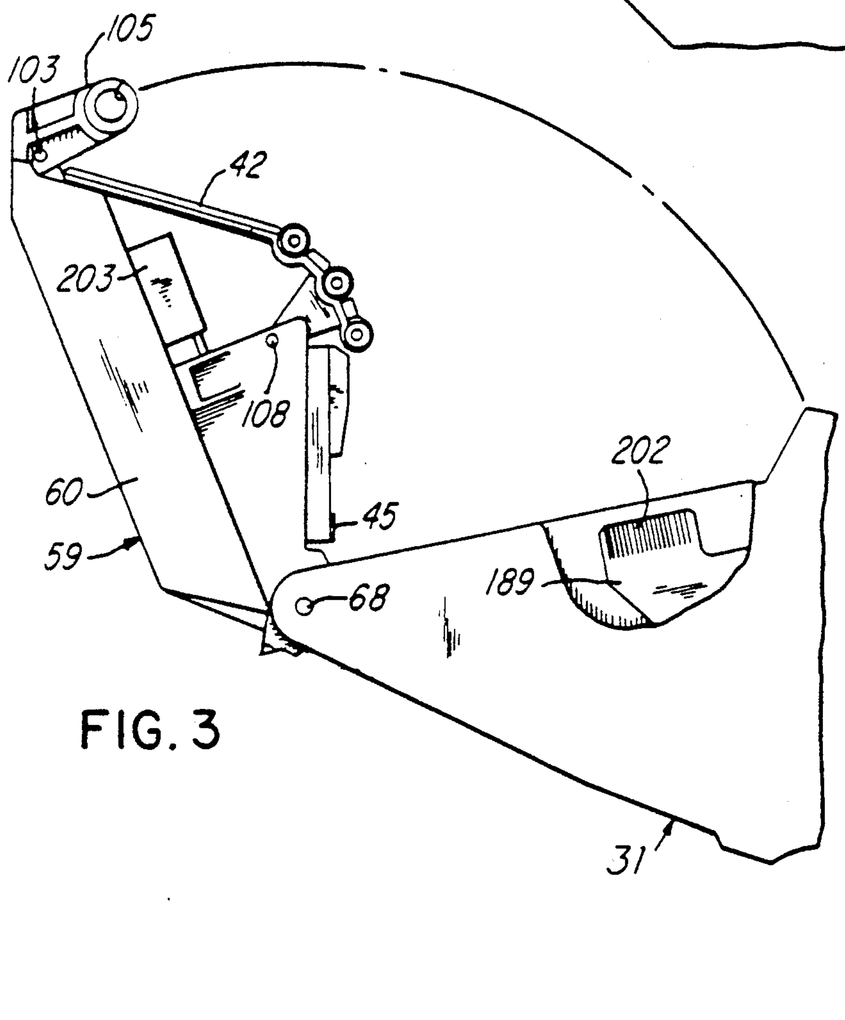
FIG. 3

MICROPROCESSOR CONTROLLED THERMAL PRINTER

CROSS REFERENCE TO RELATED APPLICATIONS

This application is related to United States patent application entitled "HAND-HELD LABELER AND METHOD OF LABELING", Ser. No. 07/209759 now U.S. Pat. No. 4,956,045 filed by Brent E. Goodwin, Donald L. Karn, John D. Mistyurik, John R. Monteith, Mark A. Seale and David R. Wisecup and to United States application entitled "RECONFIGURABLE PRINTER", Ser. No. 07/209,945 (abandoned) filed June 22, 1988 by Richard D. Wirrig, Amy S. Christopher and Donald A. Morrison both filed concurrently herewith and incorporated herein by reference. Both of the above applications are assigned to the same assignee as the assignee of the present application.

BACKGROUND OF THE INVENTION

1. Field of the Invention

This invention relates generally to printers, and more particularly to a printer usable in a handheld labeler for controlling a thermal print head for printing characters of various fonts and formats on a composite web.

2. Prior Art

Various printers are known, and examples of such printers are disclosed in U.S. Pat. Nos. 4,264,396 granted to Donald S. Stewart on Apr. 28, 1981; 4,442,774 granted to Frederick M. Pou et al. on Apr. 17, 1984; 4,556,442 granted to Daniel J. Torbeck on Dec. 3, 1985; 4,578,138 granted to Paul H. Hamisch, Jr. et al. on Mar. 25, 1986; 4,584,047 granted to James L. Vanderpool et al. on Apr. 22, 1986; and 4,603,629 granted to Frederick M. Pou on Aug. 5, 1986.

SUMMARY OF THE INVENTION

This invention relates to an improved printer which is particularly suitable for use in a hand-held labeler for controlling a thermal print head to print characters in various fonts and formats onto variable length labels disposed on a composite web.

In accordance with one feature of the invention, the printer senses the distance between successive indices on a web during a paper load sequence when a new web of stock is loaded into the printer. Two successive distances are measured, and if the measured distances are sufficiently similar, the average of the two distances is calculated, with the average value being utilized to control the amount that the web is advanced during each printing cycle.

In accordance with another feature of the invention, the printer senses the length of time each index on the web is sensed by the sensor as well as the elapsed time between the detection of successive indices, and provides an indication of a jam condition if either time period exceeds a predetermined amount. Each index has a predetermined dimension along the longitudinal axis of the web to permit the jam determination to be made while the index is still under the sensor to provide a more rapid jam indication than would be achieved by using the time period between sensors as the only jam determining criterion.

Another feature of the invention is the provision of a brake that maintains the web immovable at all times except when the web is being driven during a printing cycle in order to assure that the registration between the print head and the record members on the web is maintained. To conserve power, the brake mechanism is biased to maintain the braking force normally applied, with the braking force being electrically removed only during the printing cycle, and under the control of a microprocessor.

These and other objects, advantages and novel features of the present invention, as well as details of an illustrated embodiment thereof, will be more fully understood from the following description and the drawing.

BRIEF DESCRIPTION OF THE DRAWING

FIG. 1 is a diagrammatic side elevational view of a printer in the form of a hand-held labeler in accordance with an embodiment of the present invention;

FIG. 3 is a side elevational view of the front of the labeler of FIG. 1 showing the front in the open position;

DESCRIPTION OF THE PREFERRED EMBODIMENT

A printer employing the present invention is shown in FIG. 1 as a hand-held labeler generally indicated at 30. Although the present invention is described herein for the labeler 30, it is applicable to other types of printers that print characters in various fonts and formats onto a web of record members such as a table top printer that prints tags or the like, as shown in the aforementioned U.S. Pat. No. 4,442,774, incorporated herein by reference.

Figure 5:
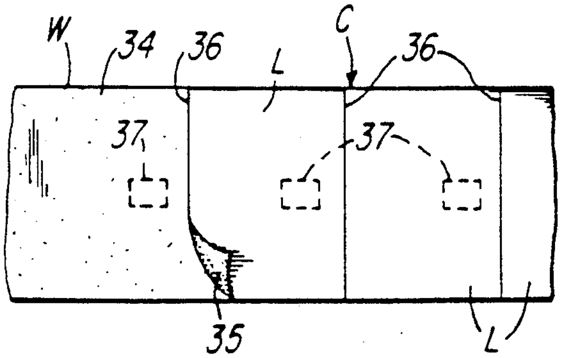
FIG. 5 is a top plan view showing a fragmentary portion of the composite label web.

The labeler 30 as shown in FIG. 1 includes a frame or housing 31 having a handle 32. The housing 31 suitably mounts a label supply roll R. The roll R is shielded from ambient conditions, such as dust by a cover 33. The roll R is comprised of a composite label web C shown in both solid lines representing a full roll R, and phantom lines representing a nearly fully depleted roll R. The composite web C includes a carrier web W having a coating of release material such as silicone wherein the labels, such as a label L' which is one of a plurality of labels L (FIG. 5), are releaseably secured to the carrier web W by a pressure sensitive adhesive. Solid, rectangular marks may be provided on the underside of the carrier web W for sensing by an optical sensor 38 in order to control various labeler functions and operations.

The composite label web C is payed out of the roll R when an advancing or feeding mechanism generally indicated at 39 is operated. The feeding mechanism 39 includes a resilient driving roll 40 and a cooperating serrated metal idler roll 41, wherein the driving roll 40 is coupled to and driven by an electric motor 162. The composite web C passes from the roll R to between a pair of spaced guides, only one of which is shown at 42.

From there the composite web C makes a gradual transition as it passes about the guide 42. The guides 42 and a guide 44 define a path for the composite web C between the place where the composite web C is payed out of the roll R on the one hand, and a print head 45 and a cooperating platen generally indicated at 46 on the other hand. The print head 45 has a straight line of closely spaced print elements, preferably thermal print elements, which extends perpendicular to the path of travel of the composite web C. The transition made by the composite web C is through an angle T not less than 85° and preferably about 96° assuming a full label supply roll R, and in addition, it is preferred that the radius R' of the path be not less than 18 mm and most preferably about 25 mm. A delaminator generally indicated at 47 includes a peel roller positioned closely adjacent the line of pressure contact between the print head 45 and the platen 46. The carrier web W passes partly about the delaminator 47 to effect delamination of the leading label L'. The leading label L' is dispensed into label applying relationship with respect to an applicator generally indicated at 48. From the delaminator 47 the carrier web W passes again into contact with the platen 46, and from there, partly about a guide roller 49 to between the neck of the rolls 40 and 41. The carrier web W has enough stiffness to be pushed along guides 50, 51 and 51' and to exit through an exit opening 52 in the housing 31 at a point above and behind the handle 32.

Figure 2:
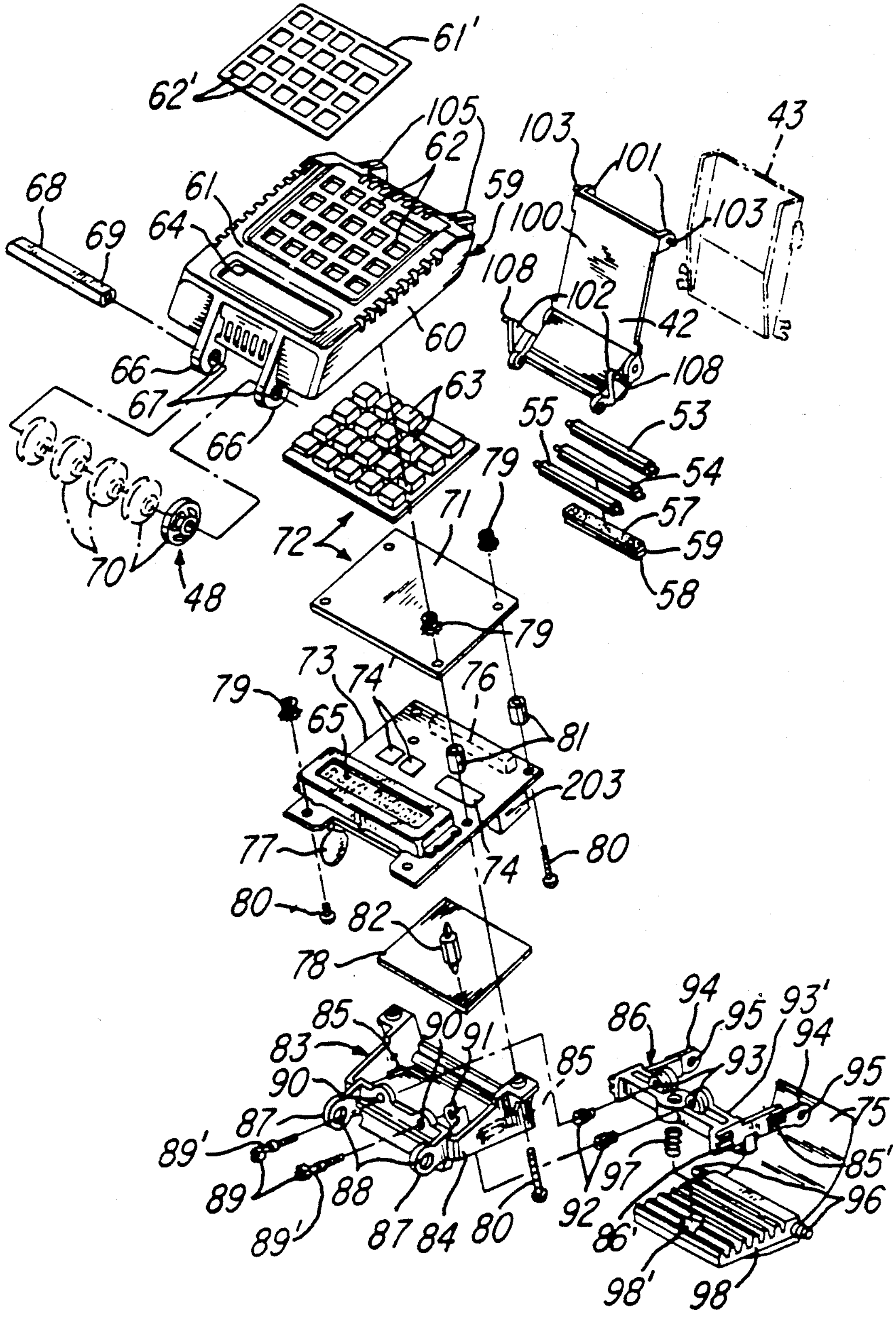
FIG. 2 is an exploded perspective view of one section of the hand-held labeler of FIG. 1.

With reference to FIG. 2, there is shown a section generally indicated at 59 for mounting various components of the labeler 30. The section 59 helps to protect such components from damage and ambient contamination and can be considered to constitute an outer part of the housing 31, if desired. The section 59 is shown to include a generally box-like member 60 having a wall portion 61 with openings 62. Keypads 63 project through the openings 62, and an opening 64 receives a display 65. A grid-like sheet 61' has holes 62' aligned with the holes 62. The holes 61' receive the keypads 63. Different areas of the sheet 61' are color coded to avoid the need for color-coding the keypads 63. The member 60 has a pair of spaced tabs 66 with aligned holes 67 for receiving a shaft 68 having flats 69. The flats 69 key the shaft 68 to the housing 31 against rotation. The shaft 68 passes through a series of rotatable applicator rollers 70 which comprise the applicator 48. The section 59 can pivot about the shaft 68 between its normally closed or operative position to its open position.

The keypads 63 and a cooperating printed circuit board 71 constitute a keyboard generally indicated at 72. Another circuit board 73 mounts the display 65, a microprocessor 74 and various other electrical components 74' which are diagrammatically illustrated. The print head 45 is connected by a ribbon connector 75 to a plug-in type connector 76 which, in turn, is connected to the microprocessor 74. The printed circuit board 73 also mounts an auxiliary lithium battery 77 for powering the microprocessor 74 when other power to the microprocessor 74 is interrupted. Additional memory is contained in a printed circuit board 78. The printed circuit boards 71 and 73 are secured to the section 59 by fasteners 79 secured to the inside of the section 59 by screws 80 received by the fasteners 79 and by spacers 81. The printed circuit board 78 is secured at two places to the printed circuit board 73 by standoffs 82 only one of which is shown.

A support generally indicated at 83 is shown to include a member 84 having spaced guides 85 for loosely and slidably guiding a mounting member generally indicated at 86. The guides 85 fit into oversized grooves 85', only one of which is shown. The member 84 has spaced tabs 87 having aligned round holes 88 which receive the shaft 68. Two screws 80 secure the support 83 to the section 59. A pair of adjusting screws 89 pass through oversize holes 90 in the member 84, through C-rings 91 and are threadably received in threaded members 92 secured in holes 93 and the mounting member 86. The C-rings 91 are received in grooves 89' and the screws 89 to prevent shifting of the screws 89 axially of the holes 90. Because of the loose sliding fit between the members 84 and 86, rotation of the screws 92, or either one of them, can skew the member 86 to in turn bring the straight line of printing elements on the print head 45 into alignment with the axis of the platen roll 46. The mounting member 86 has a pair of spaced arms 94 with round holes 95 which receive aligned studs 96. A compression spring 97 acting on the member 86 midway between arms 94 and the metal heat sink 98 which mounts the print head 45, urges the print head 45 into pressure contact with the platen roll 46 along a line of contact. The spring 97 also enables the print head to yield to accommodate big labels. The spring 97 nests in a pocket in the mounting member 86 and in a pocket 98' in the heat sink 98. The print head mounting member 86 is preferably constructed from molded plastic material and is of generally U-shaped configuration. The member 86 is preferably relatively flexible and resilient and can twist to enable the print head 45 to compensate for variations between the print head 45 and platen roll 46 due, for example, to manufacturing variations. As shown, the arms 94 are parallel to each other but they can skew due to their flexible and resilient construction. Each arm 94 is joined to a bight portion 93'. Each arm 94 has a hook-like member 86' which snaps under the heat sink 98 to couple the mounting member 86 to the heat sink 98. The members 86' allow for limited movement between the member 86 and the heat sink 98 but prevent their separation.

The guide 42 is shown in FIG. 2 to have a body 100 with a pair of tabs 101 at its one end portion and a pair of tabs 102 at its other end portion. The tabs 101 have studs 103 received in aligned holes and tabs 105 on member 60. The member 83 also has projections 106 having holes 107 for receiving studs 108 on tabs 102. The guide 42 is thus pivotal about studs 103 on the member 60, and by flexing the tabs 102 toward each other, the studs 108 can be aligned with and inserted into the holes 107 to retain the holder 56 in its operative position, where the tabs 102 can be flexed towards each other to enable the studs 108 to be withdrawn from the holes 107, to enable the holder 56 to be pivoted away to allow access to the printed circuit board 71, 73 and 78 for ease of access and disassembly.

With reference to FIG. 3, the mounting member 59 as well as the mounting member 152 are shown in their open or non-operating positions. All of the structure illustrated in FIG. 2 except guide 43 has been pivoted to the open position to expose the print head 45 and the interior of the housing 31. The mounting member 59 pivots about the shaft 68. When the mounting member 59 has been pivoted to the open or non-operating position shown in FIG. 3, the circuitry on the mounting member 59 is separated from the circuitry and mechanisms mounted in the housing 31 by a connector comprising a female portion 203 mounted on the member 59 and a male portion 202 formed on a printed circuit board 189 mounted in the housing 31. When the mounting member 59 is moved to its operative position as in FIG. 1, the connector portions 202 and 203 cooperate to interconnect the electronic and electromechanical circuitry in the member 59 and the housing 31.

Figure 4:
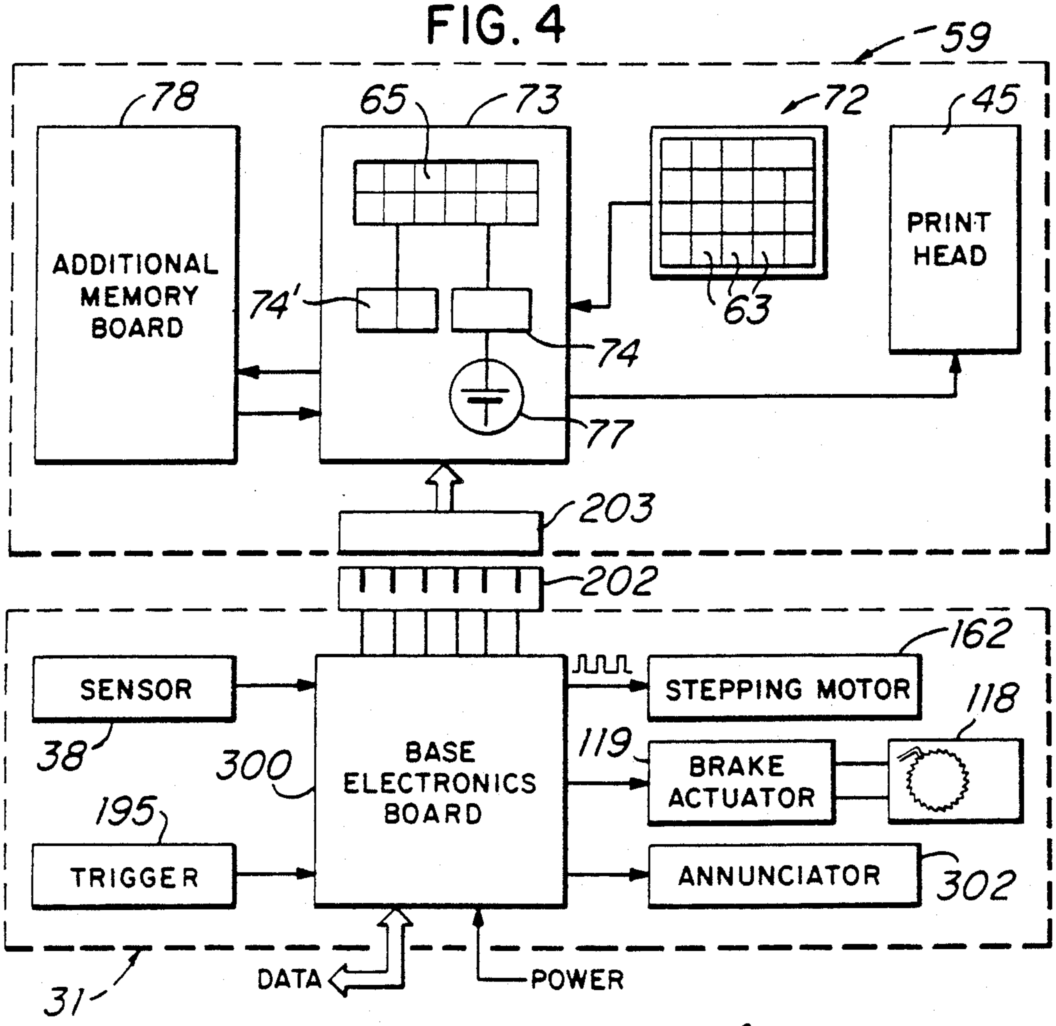
FIG. 4 is a block diagram of the labeler of FIG. 1.

Referring now to FIG. 4, many of the various components illustrated in FIGS. 1-3 are illustrated in block diagram form in FIG. 4. The components mounted on the mounting member 59 and on the housing 31 are grouped separately, with the components mounted on the mounting member 59 being enclosed by the block 59 and the components mounted in the housing 31 being enclosed by the block 31. The connector portions 202 and 203 disposed on the respective housing 31 and mounting member 59 are illustrated to show the interconnection between the components on the housing 31 and the mounting member 59. The housing 31 contains a base electronics board 300 that serves to receive signals from the sensor 38 and a trigger 195 (FIG. 1), as well as data and power. Typically the data may be received from a central computer via a suitable connector mounted on the housing 31, and power may be received from a battery contained within a removable handle affixed to the housing 31. The data applied to the labeler may be received from a central computer and may contain data defining, for example, the type of label to be printed, the format of the label, the font of the characters to be printed as well as currency symbols and price and merchandise identifying codes.

The base electronics board 300 also contains drivers for driving the web advancing motors 162 and a brake actuator or solenoid 119 that releases a brake 118 that maintains the web C in a fixed position relative to the print head 45 except when the motor 162 is energized to prevent the web C from shifting with respect to the print head 45, particularly when the label is being applied to an article of merchandise. An annunciator 302, which may be an audible beeper or the like, is used to provide prompts to the operator during the programming and operation of the labeler.

While the housing 31 contains most of the circuitry for performing the web advance and braking functions, the supporting member contains most of the circuitry for providing the data inputting, computational and printing functions. Data received via the keypads 63 of the keyboard 72 is applied to the circuit board 73 which contains the display 65 and the microprocessor 74 as well as additional circuitry generally indicated as 74' and a backup battery 77. Based on the data received via the keyboard 72 and other data received from the base electronics board 300 in the housing 31 via the connector portions 202 and 203, the circuitry on the board 73 energizes the print head 45 in the appropriate sequence to print the desired information on the web C. The additional memory board 78 is optional and is utilized only when additional features, such as, for example, the ability to print bar codes and non-standard characters is desired.

In controlling the printing of a label and determining the length of the labels on a web, it is necessary accurately to control the advancement of the web by the motor 162. In the illustrated embodiment, the motor 162 is a stepping motor which is energized by a series of pulses. The motor advances a fixed increment in response to each pulse it receives. Consequently, the angular rotation of the shaft of the motor 162 is directly proportional to the number of pulses received by the motor, and the amount the web is advanced is also directly proportional to the number of pulses received by the motor. Thus, by counting the number of pulses, the amount that the web has been advanced can be determined. Examples of printers using stepping motors are disclosed in the aforementioned U.S. Pat. Nos. 4,264,396, 4,442,774, 4,556,442 and 4,603,629 incorporated herein by reference.

Another way of determining the position of a motor shaft is to utilize a shaft encoder or tachometer that is driven by the motor. When a shaft encoder or tachometer is used, the motor 162 need not be a stepping motor, but may be any type of suitable motor. Various types of shaft encoders and tachometers exist, including those that provide an output pulse each time the motor shaft rotates a predetermined number of degrees. Thus, by counting the pulses produced by the tachometer or shaft encoder, the degree of advancement of the motor shaft and web can be determined as in the case of counting stepping motor pulses. Examples of labelers utilizing shaft encoders are disclosed in U.S. Pat. Nos. 4,584,047 and 4,578,138.

Thus, if a stepping motor is utilized or if a shaft encoder or tachometer is utilized, the number of stepping motor pulses or shaft encoder pulses can be monitored to control the operation of the printer during the printing cycle, to calibrate the system to print different types of tags, and to indicate a jam. For example, if the length of a label is known, the web is advanced by a predetermined number of pulses corresponding to the length of the label during each printing cycle. If the length of the label is not known, the number of pulses produced between the sensing of successive indices on the web may be counted, and based on that count the length of the label determined. After the length has been determined, the web can be advanced by an amount corresponding to the length thus determined during subsequent printing cycles. Also, the pulses from the tachometer or stepping motor can be used to indicate a jam condition. For example, if the lengths of the longest and shortest labels to be printed are known, a jam condition exists if the motor stops before a predetermined number of pulses corresponding to the shortest label have been generated. Similarly, a jam condition exists if the number of pulses between the sensing of successive indices exceeds a number proportional to the longest label to be printed. Similarly, if the dimension of the index mark in the direction of the longitudinal axis of the web is controlled, and the number of pulses required to advance the web by an amount equal to that distance is known, that number can be stored and used to indicate a jam condition. Thus, if the index mark should remain under the sensor for more than the number of pulses required to advance it from under the sensor another jam condition can be indicated. The manner in which stepping motor pulses or shaft encoder pulses are used to control the operation of the printer according to the invention will be discussed in a subsequent portion of the specification.

Figure 6:
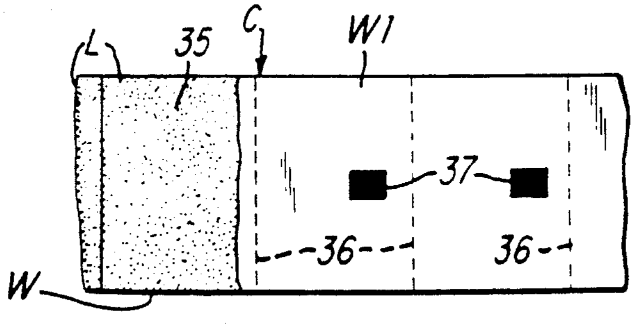
FIG. 6 is a bottom plan view of the composite label web shown in FIG. 5.

As previously discussed, the composite web C contains a plurality of labels L that are releasably secured to the carrier web W, and that marks may be provided, for example, on the underside of the carrier web W for sensing by the optical sensor 38 in order to control various functions of the labeler. The composite web C is illustrated in greater detail in FIGS. 5 and 6, and is shown to include a carrier web W having a coating of release material 34 such as silicone indicated by light stippling. Labels L are releasably secured by pressure sensitive adhesive 35 indicated by heavy stippling to the release material 34. The labels L are formed from a web WI of label material severed by complete lines of severing 36. The lines of complete severing 36 are hidden in FIG. 6 and are thus shown by broken lines. Marks 37 preferably on the underside of the carrier web W are preferably solid and rectangular and are adapted to be sensed by the optical sensor 38 for the purpose of controlling various labeler functions. The marks 37 are hidden in FIG. 5 and are thus shown by broken lines.

The distance between the marks or indices 37 on the composite web C is representative of the lengths of the labels L and is used to control the registration between the print head 45, the delaminator 47 and the labels L to assure that the printing is properly positioned on each label as the label is printed, and that a label is positioned for application to an article of merchandise at the end of a printing cycle. In addition, the spacing between the marks or indices 37 may be used to control the distance the web is advanced during each printing operation in order to automatically accommodate labels of different lengths. Also, the length of the marks or indices 37 along the longitudinal dimension of the composite web C is selected to be a predetermined dimension, for example, 0.25 inch. Thus, the time required for the mark 37 to pass under the sensor 38 may be measured to insure that the composite web C is moving properly relative to the sensor 38. If the mark 37 takes too long to pass under the sensor 38, as measured by counting stepping motor or tachometer pulses, a jam condition is indicated.

Utilizing a web having registration marks or indices that are relatively long along the direction of travel of the web has several advantages over using a web that bears indices that are relatively short in the direction of travel. Firstly, a web that has marks with relatively long dimensions can easily be printed by relatively unsophisticated printing equipment. Secondly, such indices can be easily detected and do not require a high resolution sensing device. Thirdly, since such indices have a known dimension along the direction of travel of the web, they provide more information than do relatively short indices. For example, because relatively long indices have two detectable edges, they provide location information at two locations on each label as well as information as to whether or not an index is positioned under the sensing device. The presence of an index under the sensing device for an extended period of time may be used to provide an early indication of a jam as discussed above. Finally, the defined length of the indices allows for tolerances in the advancing mechanism while still maintaining an accurate top of form indication, i.e., an indication that defines the registration or relative position between the record members and the print head.

An example of how relatively long indices may be used to control the operation of a printer follows. To assure that a label is properly positioned relative to the printing head, whenever a web advancing command is received, the sensor 38 (FIG. 4) is polled by the base electronics board 300 to determine if an index is present beneath the sensor 38. If a sensor is detected, the web is advanced by a distance corresponding to, for example, seven stepping motor or tachometer pulses. In the present example, each stepping motor or tachometer pulse corresponds to 0.0075 inch, and thus, seven pulses correspond to 0.0525 inch. After the seventh step of advance, the sensor 38 is again polled to determine if an index is present. If it is no longer present, this indicates that the label is properly positioned and printing can be initiated. If it is still present, the various jam criteria discussed in a subsequent of the specification are examined and a jam indication is provided, if appropriate. If no jam is sensed, the web is advanced to the next index and the process is repeated.

Assuming that the web is properly positioned, printing may proceed. When the next index mark is sensed, the advancement of the web is not immediately terminated, but the web is advanced twenty-eight more steps, in the present example, so that the sensor now lies approximately 0.21 inch into the mark, or about 80% of the way into the mark. Thus, upon the initiation of the next print cycle, the web must be advanced another 0.04 inch (for a mark 0.25 inch long) or about 20% of the length of the mark before the index clears the sensor. This corresponds to a distance that lies between five and six steps (0.0375 inch and 0.045 inch, respectively). Thus, if the mark has cleared the sensor within seven steps as discussed above, it indicates that the web is properly positioned. The above operations can be readily controlled with a detector that has only 0.1 inch resolution, i.e., a detector that has a field of view of 0.1 inch in diameter. Thus, an index mark can fill the entire field of view of the detector. Such a detector would have difficulty in detecting an index that was much narrower than 0.1 inch, but can easily detect a mark having a length of 0.25 inch because the resolution of the detector is about 40% of the length of the mark.

Figure 9:
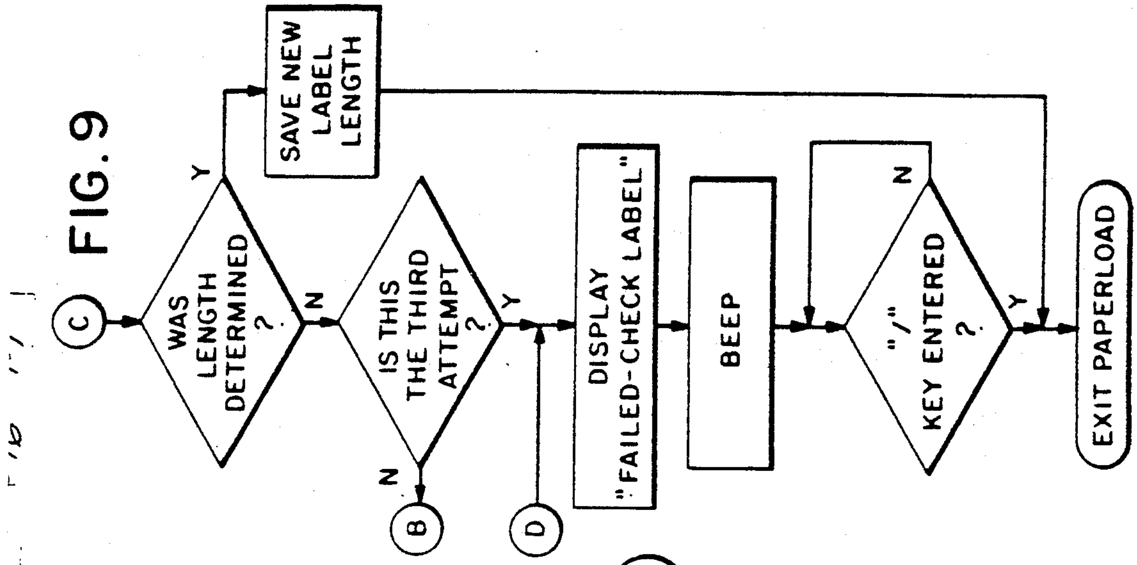
FIGS. 7–10 are logical flow diagrams indicating the logical sequence of operations performed by the labeler of FIG. 1 in its paper loading mode.
Figure 8:
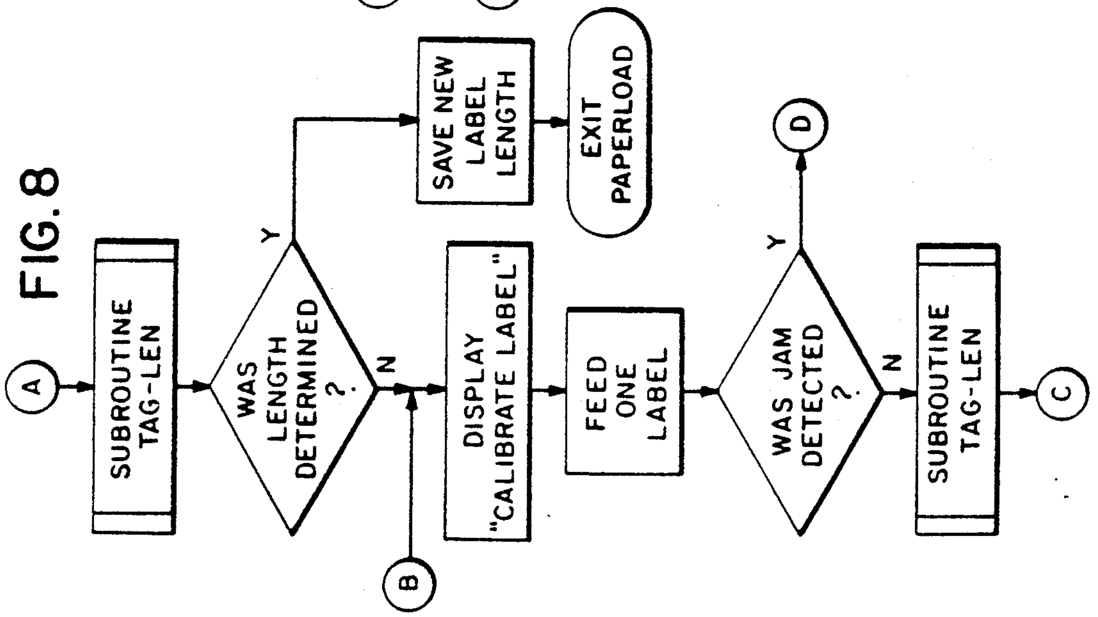
Figure 7:
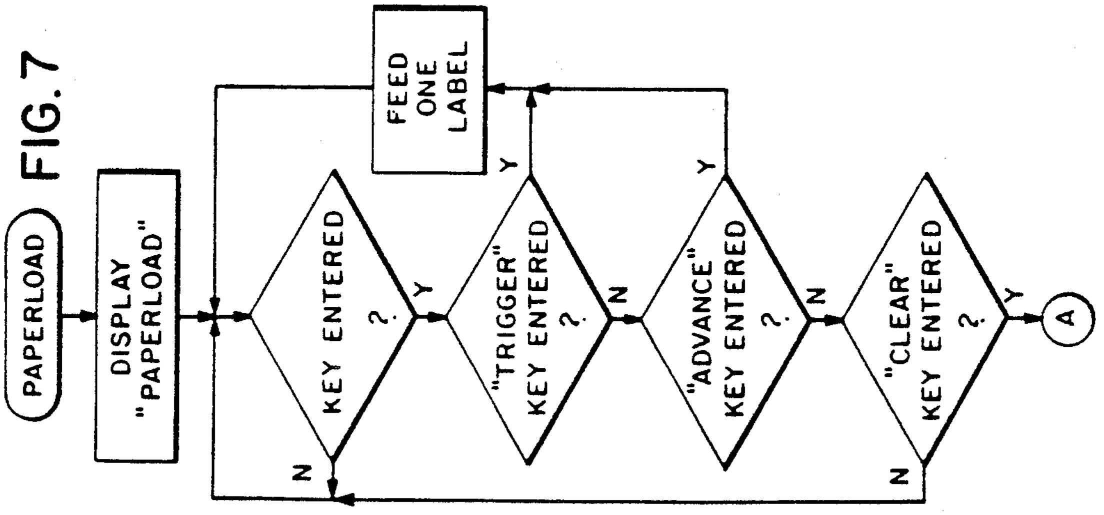

In a labeler of the type disclosed herein, it is convenient to initialize the system to determine the length of the labels on a new web when the new web is installed, and to check for a jammed web condition immediately after a new roll of labels has been placed in the machine. When a new roll has been inserted, as determined by a sensor in the path of the web or by a sensor positioned at an access door to the labeler, a routine that checks for a jam condition and also for label length is called. In the illustrated embodiment, this routine is called PAPERLOAD and is illustrated in FIGS. 7-9.

When the PAPERLOAD routine is called, the labeler displays the word "reloading" on the display 65. After the word "reloading" has been displayed, the routine determines whether any key has been actuated or entered (FIG. 7). If not, the word "reloading" will continue to be displayed by the display 65. If a key has been depressed, the routine determines whether the key depressed was the trigger 195 or another key on the keyboard (such as a right arrow key) that advances the web. If either of these keys was depressed, the labeler simply feeds one label and again displays the "reloading" message. If the key depressed is neither the trigger key nor the advance key, a determination is made whether the depressed key was the clear key. If not, the display of the word "reloading" is continued without feeding a label.

If, however, the clear key was depressed, it is indicative that the operator desires to calibrate the labeler to accommodate the length of the labels on the web installed in the labeler. Thus, in the event that the clear key is depressed when the word "reloading" is being displayed, the tag length calibrating subroutine TAG-LEN is called (FIG. 8). The subroutine TAG-LEN called in FIG. 8 is illustrated in greater detail in FIG. 10, but the description of the PAPERLOAD routine will be completed before describing the subroutine TAG-LEN in detail.

After the subroutine TAG-LEN has been called (FIG. 8) a determination is made as to whether the length of the tag was determined by the subroutine. If the length was determined, the new length will be stored and the PAPERLOAD routine exited. If not, the term "calibrate label" will be displayed and one label will be automatically fed. A determination is then made as to whether a jam was detected. The criteria for detecting a jam will be discussed in a subsequent portion of the specification, but if under those criteria a jam was detected, the labeler would display the term "failed check label" (FIG. 9) and cause the annunciator 302 to generate a beep. If the operator then entered a slash mark i.e., the symbol "/" after the beep, the routine PAPERLOAD would be exited.

If a jam was not detected after the feeding of a label (FIG. 8) the subroutine TAG-LEN would again be loaded. After the loading of the subroutine TAG-LEN, a determination would be made as to whether a tag length was determined. If so, the new label length would be saved and the routine PAPERLOAD exited. If the length was not determined, a determination would be made as to whether the attempt to determine label length was the third attempt. If not, the term "calibrate label" would again be displayed, a label would be fed, a jam detection test applied and the subroutine TAG-LEN recalled in an attempt to again determine the tag length (FIG. 8). After the subsequent attempt, if the length was determined, the new length would be saved and the routine PAPERLOAD exited. If not, the determination as to whether this was the third attempt would again be made and if it were not the third attempt, another attempt would be made. If it were the third attempt, then the term "failed check label" would be displayed and the beep generated by the annunciator 302 as in the case of a jam detection. Subsequent to the generation of the beep, the PAPERLOAD routine could be exited by depressing the "/" symbol key.

Figure 10:
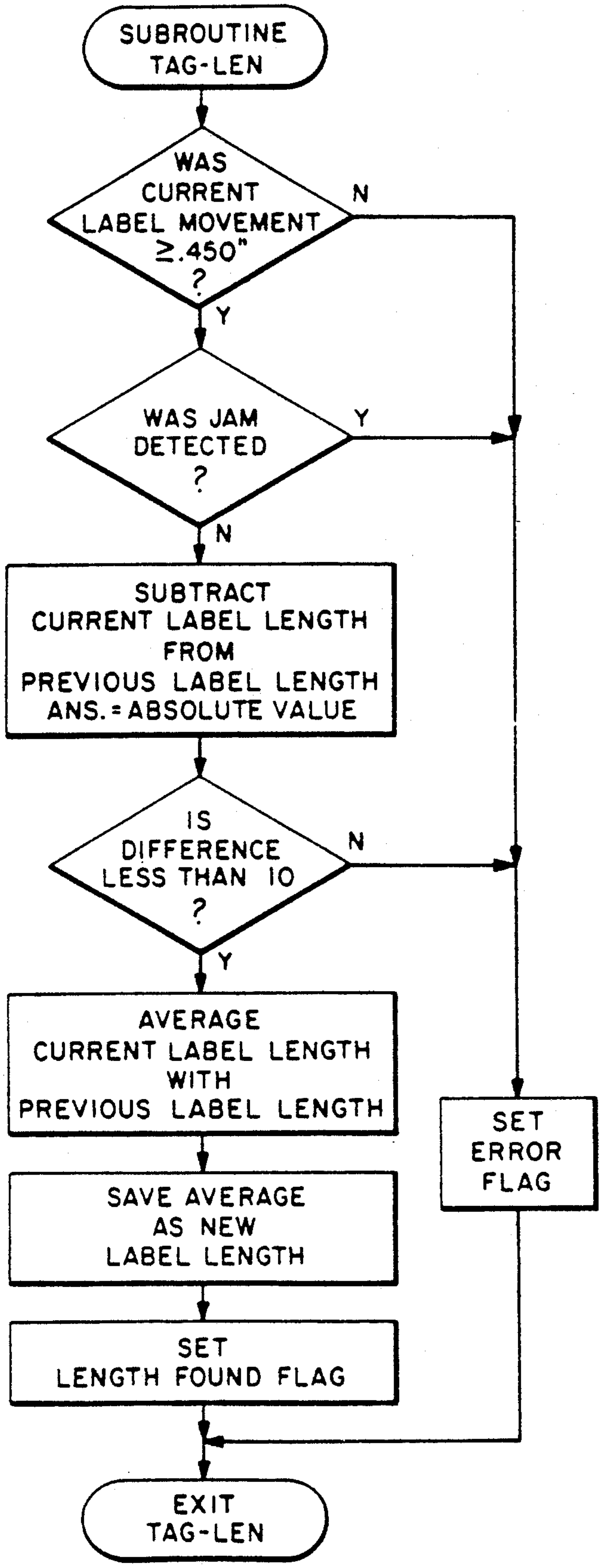

Referring now to FIG. 10, a determination is made as to whether the movement of the label was greater than or equal to 0.450 inch which is approximately equal to twice the length an index mark. If not, this condition is indicative of a jam, and an error flag is set and the TAG-LEN subroutine exited.

If the current label movement was equal to or exceeded 0.450 inch, a determination is made as to whether a jam was detected under any other jam criterion. As previously stated, the jam detection criteria will be discussed in a subsequent portion of the specification, but if a jam was detected under any of these criteria, the error flag will be set and the TAG-LEN subroutine exited. If a jam was not detected, the current label length is subtracted from the previous length. A determination is then made as to whether the difference is less than a predetermined amount, for example, less than 10 stepping motor counts or 10 tachometer pulse counts. Because the labels should all be approximately the same length, if this difference is exceeded, an error flag is set and the TAG-LEN subroutine again exited.

If the difference is less than the predetermined amount, the average of the lengths of the current label and the previous label is determined, and the average is then saved as the new label length. The "length found" flag is then set and the TAG-LEN routine is exited. The tag length thus found is useful for determining the amount of memory that must be allocated to store the print data required to print information on the label, to define the format of the label or to determine whether the print data entered by the operator is compatible with the labels on the web loaded into the labeler.

In accordance with another important aspect of the invention, several jam detecting criteria are provided. The jam detecting criteria utilize not only information relating to the distance between successive indices on the web, but also information relating to the dimension of the indices along the longitudinal axis of the web. This information is used in conjunction with information defining the longest and shortest labels that can be printed to define the jam criteria.

For example, let us assume that the longest label that can be printed is 2.5 inches long, and that the length of the index mark along the longitudinal axis of the web is 0.25 inch. It should also be understood that the above distances are given for illustrative purposes, and that other values can be chosen. Assuming the values given above, since the length of an index mark is 0.25 inch, this distance sets one of the jam criteria, that is, if the web does not travel at least 0.45 inch, as discussed above, a jam condition is indicated.

The maximum label length also sets one of the jam criteria. Since the length of the longest label to be printed is 2.5 inches, then the distance between successive index marks should not exceed 2.5 inches, and if it does, a jam condition is indicated. However, in the present embodiment, the jam criterion is set so that a jam indication is provided if the distance between the successive index marks exceeds 1.25 times the length of the longest label to compensate for various tolerances. Thus, in the present example, a jam is indicated if the web travels more than 3.125 inches without detecting an index mark.

As previously stated, the jam sometimes occurs at the beginning of a printing cycle, and in such an instance, the dimension of an index mark in the direction of travel may be used to detect the jam more quickly than would be the case if only the distance between index marks were used. For example, in the illustrated embodiment, the length in the direction of travel of each index mark is 0.25 inch. Consequently, if the index mark continues to be sensed for an interval that corresponds to a web advance of more than, for example, two times 0.25 inch, or 0.5 inch, a jam indication is provided. Thus, the jam condition can be detected without having to determine whether the next index mark is found within 1.25 times the length of the longest label.

As previously discussed, another feature of the present invention is the provision of a normally engaged brake in the path of the web to prevent the web from moving except when it is being advanced by the drive motor. Mechanically, in the present embodiment, the platen roller 46 (FIG. 1) is prevented from rotating by means of a suitable braking mechanism (not shown in FIG. 1). Various types of braking mechanisms may be employed, but in the embodiment illustrated schematically in FIG. 4, the brake 118 consists of a toothed wheel and pawl arrangement mounted on the shaft of the platen roller. The pawl is normally biased into engagement with the toothed wheel, and serves to prevent the platen roller 46 from rotating except when the brake is released by the brake actuator 119, which may be an electrically operable solenoid.

The energization of the actuator 119 is microprocessor controlled, with the actuator 119 being energized only when the web is being advanced in order to conserve electrical power. The actuator 119 is controlled by the MOTOR/BRAKE subroutine illustrated in FIG. 11.

Figure 11:
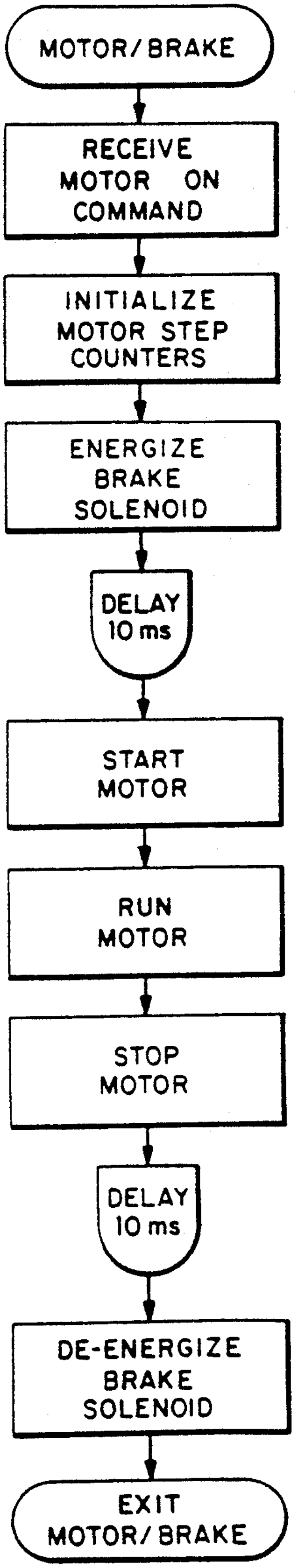
FIG. 11 is a logical flow diagram indicating the steps performed in the control of the advancing motor and brake of the labeler of FIG. 1.

Referring to FIG. 11, the MOTOR/BRAKE routine controls the operation of both the motor 162 and the brake actuator 119. When the MOTOR/BRAKE routine receives the "motor on" command, the motor step counters are initialized. The "motor on" command is received whenever it is desired to advance the web either for printing purposes or for label calibration purposes, and is typically generated when the trigger 195 is actuated.

After the motor step counters have been initialized, the solenoid 119 is energized to release the brake mechanism 118. A delay of 10 milliseconds is provided to permit the brake 118 to disengage. After the 10 millisecond delay, the motor 162 is energized and permitted to run. As the motor runs, the stepping motor or tachometer pulses are counted until the count reaches the count determined by the motor step counters, or in the case of calibration, until the next index mark is found. When the count reaches the count determined by the motor step counters or the next index mark is found, the motor is deenergized. A 10 millisecond delay is provided to permit the motor to stop rotating. The brake solenoid 119 is then deenergized and the MOTOR/BRAKE subroutine is exited.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent of the United States is:

1. A web for feeding through a printer comprising a plurality of printable record members disposed along a length thereof and a plurality of detectable indices disposed along the length in a predetermined spatial relationship with respect to said record members, a distance between successive indices being representative of the length of the record members, each of said indices having a predetermined dimension along a longitudinal travel direction axis of the web that is relatively long int he diction of travel of the web so as to provide two detectable edges representative of a predetermined amount of time for providing for providing information of a jam condition when said predetermined amount of time as determined by said predetermined dimension is exceeded during feeding, said predetermined dimension being detectable by a detector in the printer during the feeding of the web for providing a jam indication if the index is continuously detected by the detector for more than said predetermined amount of time during feeding.

2. A web as recited in claim 1 wherein said predetermined dimension is on the order of approximately 0.25 inch.

3. A web as recited in claim 1 wherein said indices have first and second edges defining said predetermined dimension. said first and second edges being parallel to each other and perpendicular to the longitudinal axis if the web.

4. A printer for printing on a web of record members, said web having a plurality of detectable indices disposed along the length thereof, said indices having a predetermined dimension along the longitudinal axis of the web, said printer having a jam detection system, comprising:

means for detecting said indices while said web is being advanced;

means responsive to said advancing means for determining the length of time that one of said indices is sensed; and means responsive to said determining means for providing an indication of a jam condition if the length of time that one of the indices is sensed while the web is being advanced exceeds a predetermined value.

5. A printer for printing on a web of record members, said web having a plurality of detectable indices disposed along the length thereof said printer including a print head, means for advancing said web past said print head and means for controlling the registration of said record members relative to said print head, said registration controlling means comprising:

means for detecting the indices on said web;

means for initiating the feeding of said web;

means responsive to said initiating means and to said detecting means for providing a registration signal, said registration signal means being operative to provide said registration signal only if an index is detected when the feeding of the web is initiated and not detected after the web has been fed a predetermined amount, said print area defining signal being responsive to the sensing of a subsequent index for terminating the feeding of the web after the subsequent index has been sensed and the web has been advanced a predetermined amount after the subsequent index has been sensed.

6. A method for controlling the registration relative to a print head of a web of record members as the web is passed through a printer, comprising, said web having a plurality of detectable indices disposed thereon:

detecting the presence or absence of one of said indices;

advancing the web a predetermined amount if the presence of one of said indices is detected;

detecting the presence or absence of one of said indices subsequent to said advancement;

providing a signal indicating registration between the print head and the web if the absence of an index is detected subsequent to the advancement;

continuing the advancement of the web until another index is detected; and continuing the advancement of the web for a predetermined amount following the detection of the other index, said predetermined amount being less than the dimension of the index along the direction of travel of the web.

7. The method recited in claim 6 wherein said indices have a predetermined length along the direction of travel of the web and wherein the predetermined amount the web is advanced if the presence of one of said indices is detected is approximately equal to b 20% of the length of an index.

8. The method recited in claim 7 wherein the advancement of the web is continued after the detection of another index by an amount approximately equal to 80% of the length of an index.

9. The method recited in claim 6 wherein the presence or absence of one of said indices is detected by a detector having a resolution of approximately 40% of the length of the mark along the direction of travel of the web.

10. A web for use in a printer comprising a plurality of printable record members disposed along the length thereof and a plurality of detectable indices disposed along the length thereof in a predetermined spatial relationship with respect to said record members, the distance between successive indices being representative of the length of the record members, said indices being detectable by a detector having a predetermined resolution within the printer, said indices having a predetermined dimension along the longitudinal travel direction axis of the web which is relatively long along the longitudinal axis of the web so as to provide two detectable edges representative of a predetermined amount of time for providing information of a jam condition when said predetermined amount of time as determined by said predetermined dimension is exceeded during feeding, said predetermined dimension being greater than the resolution of the detector.

11. A web as recited in claim 10 wherein said predetermined dimension is on the order of approximately 0.25 inch.

12. A web as recited in claim 10 wherein said indices have first and second edges defining said predetermined dimension. said first and second edges being parallel to each other and perpendicular to the longitudinal axis if the web.

13. A method of advancing a web of record members through a print head while controlling the registration of the record members relative to the print head, said web having a plurality of indices disposed thereon, said indices being detectable by a detector in the printer with each index having a measurable length in the direction of travel of the web that is greater than the resolution of the detector and greater than the minimum increment of advance of the printer, the method comprising:

providing a print initiation signal;

detecting the presence or absence of an index in the response to the print initiation signal;

advancing the web a predetermined initial amount less than the length of one of said indices only upon the detection of the presence of an index and again detecting the presence or absence of an index upon the completion of the initial amount of advance;

continuing the advancement of the web while printing only upon the detection of the absence of an index upon the completion of the initial amount of advance until the presence of another index is subsequently detected; and advancing the web a predetermined final amount less than the length of an index subsequent to the subsequent detection of the other index.

14. The method recited in claim 13 wherein said predetermined initial amount is approximately 20% of the length of one of said indices.

15. The method recited in claim 14 wherein said final amount is approximately 80% of the length of one of said indices.

16. The method recited in claim 13 further including providing an indication of an invalid condition if the absence of an index is not detected within a predetermined time after the provision of the print initiation signal.

17. The method recited in claim 16 further including providing an indication of an invalid condition if the presence of another index is not detected within a predetermined time period after the provision of the print initiation signal.

18. A web for use in a printer comprising a plurality of printable record members disposed along the length thereof and a plurality of detectable indices disposed along the length thereof in a predetermined spatial relationship with respect to said record members, the distance between successive indices being representative of the length of the record members, said web being advanceable by an advancing mechanism within the printer and said indices being detectable by a detector having a predetermined resolution within the printer, said indices having a predetermined dimension along the longitudinal axis of the web, said predetermined dimension being greater than the resolution of the detector so that it may fill the entire field of view of the detector and greater than a minimum increment of advance of the advancing mechanism to provide a measurable dimension usable to register the web with respect to the printer, wherein the presence or absence of each index is detectable and the transition between the presence and absence of an index is usable to provide registration information upon the initiation of a printing cycle, and wherein the length of the indices is dimensioned such that the presence of an index is detectable upon the initiation of a print cycle and the absence of an index is detectable after the web has been advanced a predetermined number of minimum increments of advance.

19. A web as recited in claim 18 wherein the measureable dimension is usable to provide an indication of a jam condition.

20. A web as recited in claim 18 wherein the presence or absence of each index is detectable and the transition between the presence and absence of an index is usable to provide registration information upon the initiation of a printing cycle.

21. A web as recited in claim 20 wherein the length of the indices is dimensioned such that the presence of an index is detectable upon the initiation of a print cycle and the absence of an index is detectable after the web has been advanced a predetermined number of minimum increments of advance.

22. A web as recited in claim 18 wherein the web is dimensioned such that the presence of an index is detected at the end of a print cycle and the web is advanced until the detected index fills the field of view of the detector.

23. A web as recited in claim 18 wherein said indices have first and second edges defining said predetermined dimension, said first and second edges being parallel to each other and perpendicular to the longitudinal axis if the web.

* * * * *

UNITED STATES PATENT AND TRADEMARK OFFICE
CERTIFICATE OF CORRECTION

PATENT NO. : 5,061,947

DATED : October 29, 1991

INVENTOR(S) : Donald A. Morrison et al

It is certified that error appears in the above-identified patent and that said Letters Patent is hereby corrected as shown below: Title page, item [57]:

Abstract, line 1, delete "controller" and substitute therefor --controlled--.

Column 12, line 26, delete "print area defining" and substitute therefor --registration--.

Column 12, line 26, after "signal" insert --providing means--.

Column 12, line 56, delete "b".

Column 12, line 65, delete "mark" and substitute therefor --index--.

Column 13, line 23, delete "if" and substitute therefor --of--.

Column 13, line 36, delete "the" (second occurrence).

Column 14, lines 38 through 48 (claims 20 and 21) are deleted.

UNITED STATES PATENT AND TRADEMARK OFFICE

CERTIFICATE OF CORRECTION

PATENT NO. : 5,061,947

DATED : October 29, 1991

INVENTOR(S) : Donald A. Morrison, et al.

It is certified that error appears in the above-indentified patent and that said Letters Patent is hereby corrected as shown below:

Column 14, line 57, delete "if" and insert --of--.

Signed and Sealed this

Seventh Day of June, 1994

Attest:

BRUCE LEHMAN

*Attesting Officer* *Commissioner of Patents and Trademarks*